United States Patent [19]

Lee

[11] 3,745,464

[45] July 10, 1973

[54] RADIO SYSTEM WITH FEEDBACK FOR FADING COMPENSATION

[75] Inventor: William Chien-Yeh Lee, Colts Neck, N.J.

[73] Assignee: Bell Telephone Laboratories, Inc., Murray Hill, N.J.

[22] Filed: Dec. 2, 1971

[21] Appl. No.: 204,014

[52] U.S. Cl. .................... 325/62, 325/65, 343/177, 343/179

[51] Int. Cl. .................... H04b 1/38

[58] Field of Search .................... 325/62, 65; 235/195

[56] References Cited

UNITED STATES PATENTS

| | | | |
|---|---|---|---|
| 2,425,614 | 8/1947 | Goddard | 325/62 |
| 3,444,469 | 5/1969 | Miyagi | 325/65 |
| 3,656,108 | 4/1972 | Arbuckle et al. | 325/65 |
| 2,678,998 | 5/1954 | Young | 325/62 |

*Primary Examiner*—Robert L. Griffin
*Assistant Examiner*—William S. Moore
*Attorney*—W. L. Keefauver et al.

[57] ABSTRACT

A nondiversity radio system provides compensation for multipath fading by means of continuous amplitude feedback. Intelligence is transmitted from one station by means of frequency modulation, while amplitude modulation is caused by the fading en route. At the other station the received amplitude envelope is fed back as part of a frequency modulated, return intelligence signal. The feedback envelope is used at the first station to amplitude modulate the subsequent transmission to precompensate for the anticipated fade and produce fade-free reception at the other station. The system is especially well suited for mobile radio telephone applications since fading can be eliminated at a relatively simple, single branch mobile station.

10 Claims, 2 Drawing Figures

RADIO SYSTEM WITH FEEDBACK FOR FADING COMPENSATION

BACKGROUND OF THE INVENTION

This invention relates to communication systems and, more particularly, to fading compensation techniques for mobile radio systems.

A major problem in radio transmission of modulated signals is caused by multipath fading in the transmission medium. Many environmental conditions contribute to this fading and in many systems, most notably those including fast moving mobile stations operating at high frequencies, the fading is severe enough to distort the modulation. A common method for reducing these undesired effects is to utilize diversity antenna techniques at either the transmitter or receiver. Since the signal associated with each antenna of an array fades independently if the antennas are sufficiently spaced, an improved signal is provided by selecting the best antenna signal or appropriately combining a number of them.

Diversity arrangements, however, require separate branch circuits for each antenna and this necessarily complicates the station apparatus and in many applications, such as mobile radio systems having large numbers of mobile units, commercial considerations dictate simplicity of design and corresponding low cost and low maintenance characteristics. Hence, diversity is not always an acceptable solution for multipath fading.

Feedback can also be used to compensate for fading under certain conditions. In U.S. Pat. No. 3,028,489 issued Apr. 3, 1962, N. E. Chasek discloses an arrangement directed exclusively to a multichannel PCM repeater system. Its objective is to balance thermal and intermodulation noise, and the minor fading which would upset this balance is minimized by a feedback arrangement associated with each PCM channel. While the feedback technique maintains the balance under conditions of minor frequency selective fading by providing a sample of the reception level at one repeater as an input to an AGC circuit, which controls the transmission level of the preceding repeater, the arrangement is incapable of compensating for multipath fading.

It is an object of the present invention to compensate for deep multipath fading of voice transmission by means of a feedback arrangement which does not complicate the receiving unit.

It is a further object to provide antifade reception at a mobile radio station without reliance on diversity techniques.

SUMMARY OF THE INVENTION

In accordance with the present invention a nondiversity transmission system provides multipath fading compensation by means of continuous feedback and pretransmission amplitude compensation. Intelligence is transmitted forward from one station by means of frequency modulation, but multipath fading en route causes amplitude modulation of the radio frequency signal. The amplitude envelope received at the other station is fed back as part of a frequency modulated, return intelligence signal to insure that the envelope suffers no additional fading during the feedback retransmission. In this manner, the feedback signal accurately represents the fading of the forward transmission and utilizes only an insignificant portion of the bandwidth.

A derivative of the feedback envelope is used to amplitude modulate the subsequent forward transmission in a manner which precompensates for the anticipated fade. This derived compensatory signal may be provided in one of two ways. A signal reciprocally related to the envelope creates nonlinear feedback, while a differential form of the envelope results in linear feedback. In both cases, modulation varying oppositely with the forward direction fading is introduced to the forward transmission.

This feedback arrangement will compensate for extremely deep fades which are common in high frequency voice transmission over mobile radio links, and the simplicity of the second station makes it suitable for a mobile radio unit. The first station which may be a base station may, of course, utilize a diversity technique to compensate for fading in the return direction or, alternatively, the feedback scheme may be duplicated to provide fading compensation in both directions simultaneously.

DETAILED DESCRIPTION

Figures 1, 2:
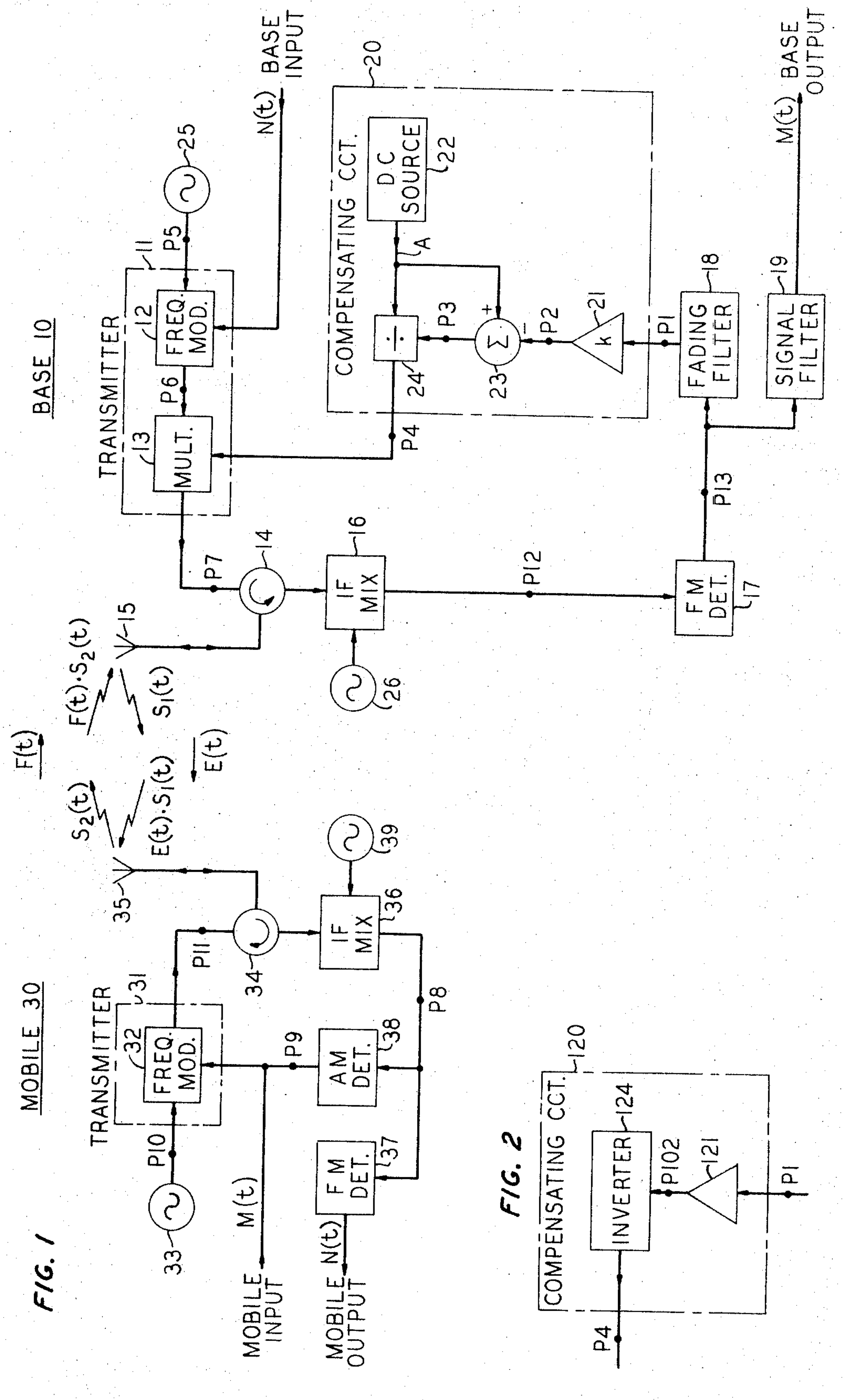
FIG. 1 is a block diagram of a system in accordance with the present invention.
FIG. 2 is a block diagram of an alternative form of the compensating circuit of FIG. 1.

In some radio systems designed for speech transmission deep multipath fading may occur at frequencies which interfere with the speech in the audio frequency band (200–2,000 Hz). Mobile radio systems operating with carrier frequencies near 1 GHz experience these severe fading effects due to the combination of the high transmission frequency and the vehicle's movement, and this fading must be eliminated in order to prevent the unacceptable audio interference. An additional complication results from the wide separation of the forward and return carrier frequencies so that the fading effect upon each is independent.

The block diagram of FIG. 1 illustrates a two-way transmission system which automatically compensates for the multipath fading of the transmission from station 10 to station 30. As the proposed arrangement is directly applicable to the mobile radio art, it is described in terms of a mobile radio telephone system and stations 10 and 30 are designated base and mobile, respectively. However, the fading compensation technique is equally applicable to other radio systems and the mobile system is presented only as one example.

Transmissions between stations 10 and 30 are designated $S_1(t)$ and $S_2(t)$. This standard function of $t$ notation is used herein to designate time variable signals. Base station 10 transmits $S_1(t)$ to mobile station 30. This forward transmission is produced in frequency modulator 12 by modulating the base input signal $N(t)$, which is normally an audio frequency or baseband input, onto the carrier generated by oscillator 25. The frequency modulated signal is amplitude modulated by a compensating signal in multiplier 13 as will be described hereinafter. Transmitter 11, which may contain in addition to modulator 12 and multiplier 13 appropriate amplifiers, produces $S_1(t)$, and this is applied via circulator 14 to antenna 15. The radiation of antenna 15 is received at antenna 35 and passed via circulator 34 to IF mixer 36 in which it is combined with the output of oscillator 39 and converted to an intermediate frequency in a standard manner. FM detector 37 removes the frequency modulation from the intermediate frequency signal to reproduce $N(t)$ at the mobile station output.

If fading compensation were not provided at station 10 by introduction of amplitude modulation at multiplier 13, the fading effect, represented as $E(t)$, upon $S_1(t)$ in the transmission path between antennas 15 and 35 would result in distortion or loss of intelligence in the audio signal $N(t)$. Compensation, in accordance with the present invention, reduces or completely eliminates this signal degradation.

The required compensation is provided by a feedback technique, and the output of mixer 36 is the source of the error signal. In addition to being FM detected, this intermediate frequency signal is also AM detected by detector 38 to produce a time variable signal $x(t)$ which varies with the amplitude of the reception of antenna 35 and, hence, serves as an error signal since it contains a component representative of the amplitude envelope of the fading $E(t)$. The error signal $x(t)$ is fed back, together with the return intelligence signal $M(t)$, which is provided at the mobile station input and is conventionally an audio frequency signal. The frequency of $x(t)$ will depend upon the fading rate and, if it is below the audio band of $M(t)$, as it is in 1 GHz mobile systems, then these two signals $x(t)$ and $M(t)$ occupy distinct frequency bands which will not interfere with one another. Preferably, $x(t)$ will be upconverted in detector 38 to a frequency above the audio band of $M(t)$, such as 3,000 Hz, so that the subsequent filtering at base station 10 can be provided with reduced delay. The combination of the two frequency separated signals is applied as a single baseband input to frequency modulator 32 where it is used to frequency modulate a carrier generated by oscillator 33. The output of transmitter 31, which consists of modulator 32 and appropriate amplifiers, is the return signal designated $S_2(t)$ and it is radiated by antenna 35.

At station 10, the received signal will exhibit fades and may be designated $F(t)\cdot S_2(t)$, where $F(t)$ represents the fading effect upon $S_2(t)$ and will likely be substantially different from the fading effect $E(t)$ upon $S_1(t)$. The reception is converted to an appropriate intermediate frequency by IF oscillator 26 and IF mixer 16. FM detector 17 then strips off the frequency modulation and appropriate bandpass filters 18 and 19 separate the two components $M(t)$ and $x(t)$. It is noted that the system of FIG. 1 provides compensation for the fading of $S_1(t)$ only and, if no compensation for the fading of $S_2(t)$ is provided, the signal $M(t)$ at the base output may suffer distortion. This can, of course, be avoided either by providing diversity reception at base station 10 or by duplicating the corrective apparatus to provide compensation for fading in the return direction from station 30 to station 10 as well as in the forward direction from station 10 to station 30.

The representation $x(t)$ of the envelope of the received signal at station 30 is passed by fading filter 18 to compensating circuit 20. Circuit 20 derives from $x(t)$ a corrective signal which varies oppositely with the amplitude of the signal received at station 30 and, hence, varies oppositely with the fading envelope $E(t)$. This oppositely varying signal is used to amplitude modulate in multiplier 13 the frequency modulated signal from modulator 12 so that the output of transmitter 11 is precompensated for the anticipated multipath fading $E(t)$.

The effectiveness of the compensation is, of course, dependent upon the rate of the fading and the feedback delay time. For instance, in a mobile radio system operating at frequencies in the vicinity of 1 GHz a mobile station moving at 60 miles per hour will experience fading at rates on the order of 150 Hz. In contrast, the total loop delay of such a system will be the sum of approximately: 40 microseconds for a round trip transmission between stations separated by 5 miles, a 110 microsecond delay inherent in filter 18 if $x(t)$ is above the audio band of $M(t)$ and two 20 microsecond delays inherent in the IF filters of mixers 16 and 36. The delay is, therefore, approximately 190 microseconds which is at least 30 times shorter than the time of an average fade. Accordingly, negligible fading variation can be assumed during this short total loop delay, and under these circumstances the system operating under steady state conditions can be expected to provide adequate compensation for multipath fading of voice signals.

In order to understand the feedback operation of the system of FIG. 1, the steady state signals at selected circuit locations P are presented algebraically. The error signal $x(t)$ at point P1 is substantially the same as the detected signal at P9 if the loop delay is very small relative to the time of an average fade. It is applied to compensating circuit 20 which is illustrated as an arrangement of linear elements consisting of amplifier 21, d.c. voltage source 22, combiner 23 and divider 24. Amplifier 21 which provides a linear gain $k$ on the order of 100 produces $kx(t)$ at point P2.

Potential source 22 generates a constant d.c. voltage of A volts which is combined differentially with $kx(t)$ in combiner 23 to yield $A - kx(t)$ at point P3.

This signal is then divided by A volts in divider 24 to produce the compensating signal $[A - kx(t)/A]$ at point P4.

This linear compensating signal varies, differentially with $x(t)$ and, hence, differentially with the fading envelope. It is used to amplitude modulate the frequency modulated output of modulator 12 so that the envelope of the radiation varies oppositely with the fading.

The frequency modulated signal $A[\cos \omega_1 t + \psi_{N(t)}]$ at point P6 is produced by modulating the forward intelligence signal $N(t)$ onto the carrier output of oscillator 25

$A \cos \omega_1 t$ at point P5. The signal at P6 is combined with the compensating signal in multiplier 13 to produce the base 10 output signal $S_1(t)$ which is $[A - kx(t)] \cos[\omega_1 t + \psi_{N(t)}]$ at point P7.

While the amplitude modulation may be accomplished by multiplier 13, a balanced modulator consisting of two amplitude modulators arranged in a balanced configuration may also be used. This alternative arrangement will provide complete suppression of the center frequency and, therefore, conserve power. It is noted that the amplitude A of the carrier at point P5 must be identical to the voltage of source 22. It may, therefore, be possible to eliminate source 22 and derive the required d.c. voltage from oscillator 25.

The fading effect upon $S_1(t)$ in the transmission path is designated $E(t)$ so that the signal received at antenna 35 is $E(t)\cdot S_1(t)$. After conversion to an IF frequency $\omega'_1$, this signal $E(t)\cdot S'_1(t)$ is $$E(t)\ [A - kx(t)]\ \cos[\omega'_1 t + \psi_{N(t)}] \text{ at point P8.}$$

This is FM detected to produce the forward intelligence signal $N(t)$ at the mobile output. No significant fading is present due to the precompensation provided at station 10.

The IF signal is also AM detected to provide an error signal $$E(t)\ [A - kx(t)] \text{ at point P9,}$$

which is, designated $x(t)$. This error signal which represents the net amplitude variation of the reception, that is, a combination of the fading and the precompensating amplitude modulation, is combined with the return intelligence $M(t)$ from the mobile input and applied as a composite baseband signal to frequency modulator 32. The return carrier generated by oscillator 33 is $$B \cos \omega_2 t \text{ at point P10}$$

and the frequency modulated output $S_2(t)$ is $$B \cos [\omega_2 t + \psi_{M(t)} + \psi_{x(t)}] \text{ at point P11.}$$

The fading of the return transmission is $F(t)$ and the IF form of the reception at station 10 is, therefore, $$BF(t) \cos [\omega'_2 t + \psi_{M(t)} + \psi_{x(t)}] \text{ at point P12.}$$

The modulation of this signal is $$M(t) + x(t) \text{ at point P13,}$$

and the two components are separated by appropriate filters 18 and 19. Filter 19 passes the base output $M(t)$ which may experience fading unless compensation of $F(t)$ is provided. While such additional compensation is possible, it is not shown in FIG. 1. Filter 18 passes $x(t)$ which was assumed to be the input at point P1.

It is noted that time delays have been ignored, but the total delay time comprising the transmission delays and those inherent in the IF filters and fading filter 18 are small in relation to the anticipated rate of $E(t)$; and under the condition that $kE(t) >> 1$, which is easily provided for by insuring a large value of $k$, then conventional feedback analysis of the linear loop shows that $x(t)$ at point P9 will be essentially constant indicating fade-free reception.

In addition to the compensating circuit 20 shown in FIG. 1, an alternative arrangement designated circuit 120 is shown in FIG. 2. Circuit 120, which contains nonlinear amplifier 121 and inverter 124, may be substituted directly for circuit 20 and the system will operate similarly except that the linear feedback will be replaced by nonlinear feedback. Amplifier 121 is a nonlinear device which produces an output $k$ times it input raised to the power $v$. If the error signal at point P1 is $x(t)$, the amplified signal is $$k[x\ (t)] \text{ at point P102.}$$

Inverter 124 generates the inverse of its input producing a reciprocal compensating signal $$1/(k[x\ (t)]) \text{ at point P4.}$$

The remainder of the system in FIG. 1 functions identically to the linear operation and $S_1(t)$ is $$A/(k[x\ (t)]) \cos[\omega_1 t + \psi_{N(t)}] \text{ at point P7.}$$

The resultant error signal produced by detector 38 is $$E(t)\ [A/(kx\ (t))] \text{ at points P9 and P1.}$$

As in the linear case the total loop delay is substantially shorter than the time of an average fade, and from analysis of the nonlinear loop if $v >> 1$, $x(t)$ is constant indicating fade-free reception.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A radio communication system with compensation for multipath fading comprising:

means at a first station for generating a forward signal containing forward intelligence modulation, means at the first station for transmitting the generated forward signal and for receiving a return signal containing return intelligence modulation, means at a second station for transmitting the return signal and for receiving the forward signal, sensing means for continuously detecting at the second station the amplitude envelope of the received forward signal and producing an indication thereof, said amplitude indication being representative of the multipath fading experienced by the forward signal in the transmission path between the first and second stations, feedback means at the second station for incorporating the amplitude indication as part of a return intelligence input and for modulating the input onto the return signal, separation means at the first station for removing the amplitude indication from the modulation of the return signal received at the first station, compensation means at the first station consisting exclusively of linear elements for producing from the removed amplitude indication a compensating signal having an amplitude variation derived from the amplitude variation of the detected envelope, the compensating signal being linearly related to the time varying difference between the amplitude of the generated forward signal and the detected amplitude envelope, and said means for transmitting the generated forward signal including means for amplitude modulating the generated forward signal in response to the compensating signal to precompensate for the transmission path fading.

2. A radio communication system as claimed in claim 1 wherein said compensation means includes means for linearly amplifying the amplitude indication and means for taking the difference between the amplitude of the generated forward signal and the amplified amplitude indication.

3. A radio communication system as claimed in claim 1 wherein forward intelligence and return intelligence are frequency modulated onto carriers to produce the forward and return signals respectively.

4. A radio communication system as claimed in claim 1 wherein said means for amplitude modulating the generated forward signal is a multiplier for multiplicatively combining the forward signal and the compensating signal.

5. A radio communication system as claimed in claim 1 wherein said system is a mobile radio system in which the first station is a base station and the second station is a mobile station and the forward and return signals are frequency modulated signals transmitted at frequencies in the 1 GHz range, and wherein said sensing means includes means for producing the amplitude indication at a frequency above the other part of the return intelligence input.

6. A radio communication system with compensation for multipath fading comprising:

means at a first station for generating a forward signal containing forward intelligence modulation, means at the first station for transmitting the generated forward signal and for receiving a return signal containing return intelligence modulation, means at a second station for transmitting the return signal and for receiving the forward signal, sensing means for continuously detecting at the second station the amplitude envelope of the received forward signal and producing an indication thereof, said amplitude indication being representative of the multipath fading experienced by the forward signal in the transmission path between the first and second stations, feedback means at the second station for incorporating the amplitude indication as part of a return intelligence input and for modulating the input onto the return signal, separation means at the first station for removing the amplitude indication from the modulation of the return signal received at the first station, compensation means at the first station including nonlinear elements for producing from the removed amplitude indication a compensating signal having an amplitude variation derived from the amplitude variation of the detected envelope, the compensating signal being reciprocally related to the time varying amplitude indication, and said means for transmitting the generated forward signal including means for amplitude modulating the generated forward signal in response to the compensating signal to precompensate for the transmission path fading.

7. A radio communication system as claimed in claim 6 wherein said compensation means includes means for nonlinearly amplifying the amplitude indication and means for inverting the amplified amplitude indication.

8. A radio communication system as claimed in claim 6 wherein the forward intelligence and the return intelligence are frequency modulated onto carriers to produce the forward and return signals respectively.

9. A radio communication system as claimed in claim 6 wherein said means for amplitude modulating the generated forward signal is a multiplier for multiplicatively combining the forward signal and the compensating signal.

10. A radio communication system as claimed in claim 6 wherein said system is a mobile radio system in which the first station is a base station and the second station is a mobile station and the forward and return signals are frequency modulated signals transmitted at frequenices in the 1 GHz range, and wherein said sensing means includes means for producing the amplitude indication at a frequency above the other part of the return intelligence input.

* * * * *